US012773041B2

(12) United States Patent
Lawson et al.

(10) Patent No.: US 12,773,041 B2
(45) Date of Patent: Oct. 27, 2026

(54) BRUSH SYSTEMS, TRANSFER SYSTEMS, AND MOLDING SYSTEMS INCLUDING SAME

(71) Applicant: Graham Packaging Company, L.P., Lancaster, PA (US)

(72) Inventors: Eric D. Lawson, Louisville, KY (US); Danny R. Clark, Wilmore, KY (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 147 days.

(21) Appl. No.: 18/796,625

(22) Filed: Aug. 7, 2024

(65) Prior Publication Data

US 2026/0041226 A1 Feb. 12, 2026

(51) Int. Cl.

| | |
|---|---|
| ***A46B 5/06*** | (2006.01) |
| ***A46B 13/02*** | (2006.01) |
| ***B29C 49/06*** | (2006.01) |
| ***B29C 49/42*** | (2006.01) |
| ***B29K 67/00*** | (2006.01) |

(Continued)

(52) U.S. Cl.

CPC ................ *A46B 5/06* (2013.01); *A46B 13/02* (2013.01); *B29C 49/06* (2013.01); *B29C 49/42065* (2022.05); *B65G 19/025* (2013.01); *A46B 2200/405* (2013.01); *B29K 2067/003* (2013.01); *B29L 2031/7158* (2013.01); *B65G 2201/0247* (2013.01)

(58) Field of Classification Search

CPC ..... A46B 5/06; A46B 13/02; A46B 2200/405; B29C 49/06; B29C 49/42065; B65G 19/025; B65G 2201/0247; B29K 2067/003; B29L 2031/7158

See application file for complete search history.

(56) References Cited

U.S. PATENT DOCUMENTS

| | | | | |
|---|---|---|---|---|
| 1,352,527 A * | 9/1920 | Radimak | ................ | A46B 13/02 15/23 |
| 4,902,184 A | 2/1990 | Fritz | | |

(Continued)

FOREIGN PATENT DOCUMENTS

| | | |
|---|---|---|
| CN | 214032222 | 8/2021 |
| CN | 115214109 | 10/2022 |

(Continued)

*Primary Examiner* — Gene O Crawford
*Assistant Examiner* — Abby A Jorgensen
(74) *Attorney, Agent, or Firm* — Armstrong Teasdale LLP

(57) ABSTRACT

Brush systems for transferring preforms along a rail include a cam including a follow extending from the cam, and a bracket positioned adjacent the cam. The bracket includes a slot for receiving the follow of the cam. The brush system also includes a brush assembly coupled to the bracket. The brush assembly includes a yoke positioned adjacent to and operably connected to the cam, a brush holder coupled to the yoke, opposite the cam, and a plurality of brushes positioned within the brush holder. Additionally, the brush system includes a motor coupled to and configured to rotate the cam. Rotation of the cam causes the bracket and the brush assembly to move in a first direction, and the brush holder and the plurality of brushes of the brush assembly to move in a second direction substantially perpendicular to the first direction.

20 Claims, 7 Drawing Sheets

(51) Int. Cl.
*B29L 31/00* (2006.01)
*B65G 19/02* (2006.01)

(56) References Cited

U.S. PATENT DOCUMENTS

| | | | | |
|---|---|---|---|---|
| 5,950,804 | A * | 9/1999 | Farkas | B65G 19/025<br>198/626.1 |
| 6,488,449 | B1 | 12/2002 | Laquay et al. | |
| 8,349,270 | B2 | 1/2013 | Winzinger et al. | |
| 9,333,679 | B2 | 5/2016 | Seger | |
| 10,035,655 | B2 * | 7/2018 | Fevre | B65G 15/105 |
| 10,405,518 | B2 * | 9/2019 | Zhang | A46B 13/02 |
| 10,960,826 | B2 * | 3/2021 | Dry | B60N 2/07 |
| 2004/0170479 | A1 | 9/2004 | Huxley et al. | |
| 2016/0045081 | A1 * | 2/2016 | Kern | A46B 13/008<br>15/22.4 |
| 2018/0338654 | A1 * | 11/2018 | Kelsey | A47L 9/0477 |
| 2020/0268139 | A1 * | 8/2020 | Doddema | B24B 29/005 |
| 2021/0187566 | A1 * | 6/2021 | Della Torre | A46B 13/02 |
| 2023/0320479 | A1 * | 10/2023 | Carli | A46B 11/063<br>134/6 |

FOREIGN PATENT DOCUMENTS

| | | |
|---|---|---|
| EP | 1291304 | 5/2006 |
| FR | 3101622 | 4/2021 |
| FR | 3102761 | 5/2021 |
| JP | 3201515 | 12/2015 |
| WO | 1997010163 | 3/1997 |
| WO | 2006084831 | 8/2006 |
| WO | 2014076450 | 5/2014 |
| WO | 2016166446 | 10/2016 |
| WO | 2018046873 | 3/2018 |
| WO | 2020249416 | 12/2020 |

* cited by examiner

BRUSH SYSTEMS, TRANSFER SYSTEMS, AND MOLDING SYSTEMS INCLUDING SAME

TECHNICAL FIELD

The present disclosure relates generally to a brush system of a molding system, and more particularly to a moveable brush system included in a transfer system for moving items along a rail during operation.

BACKGROUND

Plastic hollow containers are manufactured by blow molding or injection molding systems. In such systems, preforms are fed through various system components such as hoppers, sorters, scramblers, star wheels, blowers, reheat stretch blow molders, heaters and coolers, and the like. The preforms are transferred between system components using a combination of conveyors and rail systems. Such rail systems include gravity rails which may connect an outfeed of a first system component with an infeed of a downstream second system component. The output feed of the first system component is at a higher elevation relative to the infeed feed of a second system component such that the preforms slide along the connecting rail from the first machine to the second machine, drawn along the downward trajectory defined by the rail primarily by gravity.

Preforms conventionally slide along inner flanges of the gravity rail system and are supported by the inner flanges of the rail system along a preform neck. The preform neck is in contact with the rails and this contact enables the preform to slidably follow the rail between system components. Jammed preforms occur when a preform falls out of the track formed by the inner flanges such that the neck creates a friction fit with at least one inner flange so that the neck is no longer able to slidably travel along the inner flange toward the second system component input feed.

Conventional solutions to the jamming and blocking of rails include creating tighter tolerances between the inner flanges of the rail and the neck of the wide-mouth preform, however the tighter tolerances increase friction between the inner flanges of the rail and the neck of the wide-mouth preform. The greater magnitude friction can negatively impact the integrity of the preform and ultimately result in a lower quality manufactured bottle.

Additionally, when system jamming or blocking occurs, portions or the entirety of the manufacturing line must be shut down to remove the preform that is jammed and causing the rail blockage. Thus, there is a need in the art to mitigate jamming and blocking of preforms in gravity feed rail systems.

SUMMARY

In one aspect, a brush system for transferring preforms along a rail is disclosed, where the brush system comprises, a cam including a follow extending perpendicularly from the cam, and a bracket positioned adjacent the cam. The bracket includes a slot for receiving the follow of the cam. The brush system also includes a brush assembly coupled to the bracket. The brush assembly includes a yoke positioned adjacent to and operably connected to the cam, a brush holder coupled to the yoke, opposite the cam, and a plurality of brushes positioned within the brush holder. Additionally, the brush system includes a motor coupled to and configured to rotate the cam. Rotation of the cam causes the bracket and the brush assembly to move in a first direction, and the brush holder and the plurality of brushes of the brush assembly to move in a second direction substantially perpendicular to the first direction.

In another aspect, a transfer system for transferring a plurality of items is disclosed, where the transfer system comprises a rail for receiving the plurality of items, where the rail includes an opening. At least a portion of each of the plurality of items received by the rail extend through the opening. The transfer system also includes a brush system positioned adjacent the rail, the brush system includes a cam including a follow extending perpendicularly from the cam, a bracket positioned adjacent the cam, where the bracket includes a slot for receiving the follow of the cam, and a brush assembly coupled to the bracket. The brush assembly includes a yoke positioned adjacent to and operably connected to the cam, a brush holder coupled to the yoke, opposite the cam and adjacent the rail, and a plurality of brushes positioned within the brush holder. The plurality of brushes extend from the brush holder towards the rail. The brush system also includes a motor coupled to and configured to rotate the cam, wherein rotation of the cam causes the bracket and the brush assembly to move in a first direction, and the brush holder and the plurality of brushes of the brush assembly to move in a second direction substantially perpendicular to the first direction.

In another aspect, a molding system is disclosed, where the molding system comprises a first machine including a plurality of items, a second machine positioned proximate the first machine, and a transfer system positioned between and operably connecting the first machine and the second machine to transfer the plurality of items from the first machine and the second machine. the transfer system includes a rail for receiving the plurality of items, where the rail includes an opening. At least a portion of each of the plurality of items received by the rail extends through the opening. The transfer system also includes a brush system positioned adjacent the rail. The brush system includes a cam including a follow extending perpendicularly from the cam, a bracket positioned adjacent the cam, the bracket including a slot for receiving the follow of the cam, and a brush assembly coupled to the bracket. The brush assembly includes a yoke positioned adjacent to and operably connected to the cam, a brush holder coupled to the yoke, opposite the cam and adjacent the rail, and a plurality of brushes positioned within the brush holder, where the plurality of brushes extend from the brush holder towards the rail. The brush system also includes a motor coupled to and configured to rotate the cam, where rotation of the cam causes the bracket and the brush assembly to move in a first direction, and the brush holder and the plurality of brushes of the brush assembly to move in a second direction substantially perpendicular to the first direction.

BRIEF DESCRIPTION OF THE DRAWINGS

The subject-matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
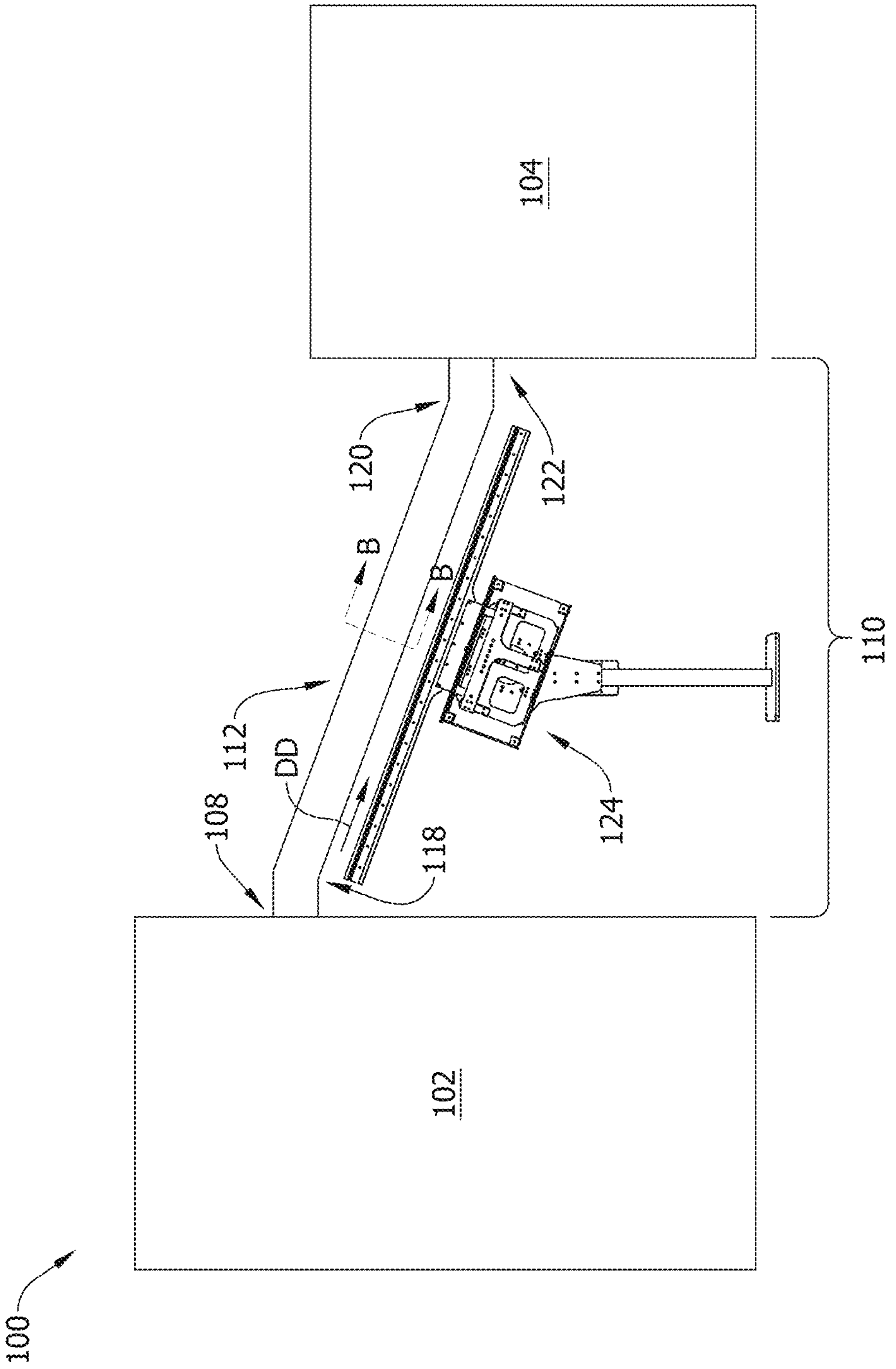
FIG. 1 illustrates a schematic representation of a molding system including a transfer system formed from a rail and a brush system in accordance with one or more embodiments of the present disclosure.

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the term "preform" refers to a plastic, thermoplastic or polyethylene terephthalate "PET" plastic preform for use in injection molding and blow molding applications. The preform commonly includes an injection molded body having a threaded end, a lip adjacent to the threaded end, a neck adjacent to the lip, and a cylindrical or conical body adjacent to the neck. Gripping or transfer devices of a manufacturing line for injection molding and blow molding applications commonly interface with the lip and/or the neck of the preform to transfer or secure the preform.

The methods, systems, and apparatus described herein overcome at least some disadvantages of gravity feed rails. More specifically, the systems and methods of operations described herein improve the ability to minimize jamming and blocking caused by preforms when the preforms are slidably moving along the rail, as well as improving the movement of the preforms within the rail during operation. Brush systems, used in combination with gravity feed rails, aid and/or improve the movement of preforms within the rail. That is, components of the brush systems described herein contact the preforms positioned within and sliding on the gravity rails to ensure the preforms continue to move along the feed rail between two different components and/or processes of the molding system. Additionally, brush systems contact preforms to realign or adjust the position of preforms within the rail that may be misaligned, jammed, and/or blocked.

FIG. 1 illustrates a schematic representation of a molding system 100. Molding system 100 includes a first machine 102 and a second machine 104. First machine 102 and second machine 104 can be selected from the group consisting of hoppers, sorters, scramblers, star wheels, blowers, reheat stretch blow molders, heaters and coolers, and the like commonly found on manufacturing lines for blow molding. First machine 102 and second machine 104 process or sort items, for example, preforms 106 (see, FIG. 2) at various stages of the blow molding process. First machine 102 includes an outfeed 108 to enable preforms 106 to move outward from first machine 102. A transfer system 110 includes a rail 112 that bridges the distance between first machine 102 and second machine 104. Rail 112 of transfer system 110 includes an inlet end 118 connected to outfeed 108 of first machine 102 and is positioned at a greater vertical distance above the floor or base than the position of outlet end 120 of rail 112 where the rail 112 connects to infeed 122 of second machine 104. As a result, outfeed 108 of first machine 102 is at a higher elevation relative to infeed 122 of second machine 104. First machine 102 transfers preforms 106 to rail 112 (also referred to as an airveyor). As preforms 106 travels along rail 112 and downward from outfeed 108 to the infeed 122, preforms 106 travel in a downward direction identified as "DD" in FIG. 1.

Transfer system 110 of molding system 100 also includes a brush system 124. As shown in FIG. 1, brush system 124 is positioned adjacent to and below rail 112 and preforms 106 traveling in the downward direction (DD) between first machine 102 and second machine 104, within rail 112. As discussed herein, brush system 124 of transfer system 110 facilitates, aids, and/or improves the movement of preforms 106 within rail 112 by engaging and/or contacting preforms 106 with a plurality of brushes also configured to move in the downward direction (DD).

Figure 2:
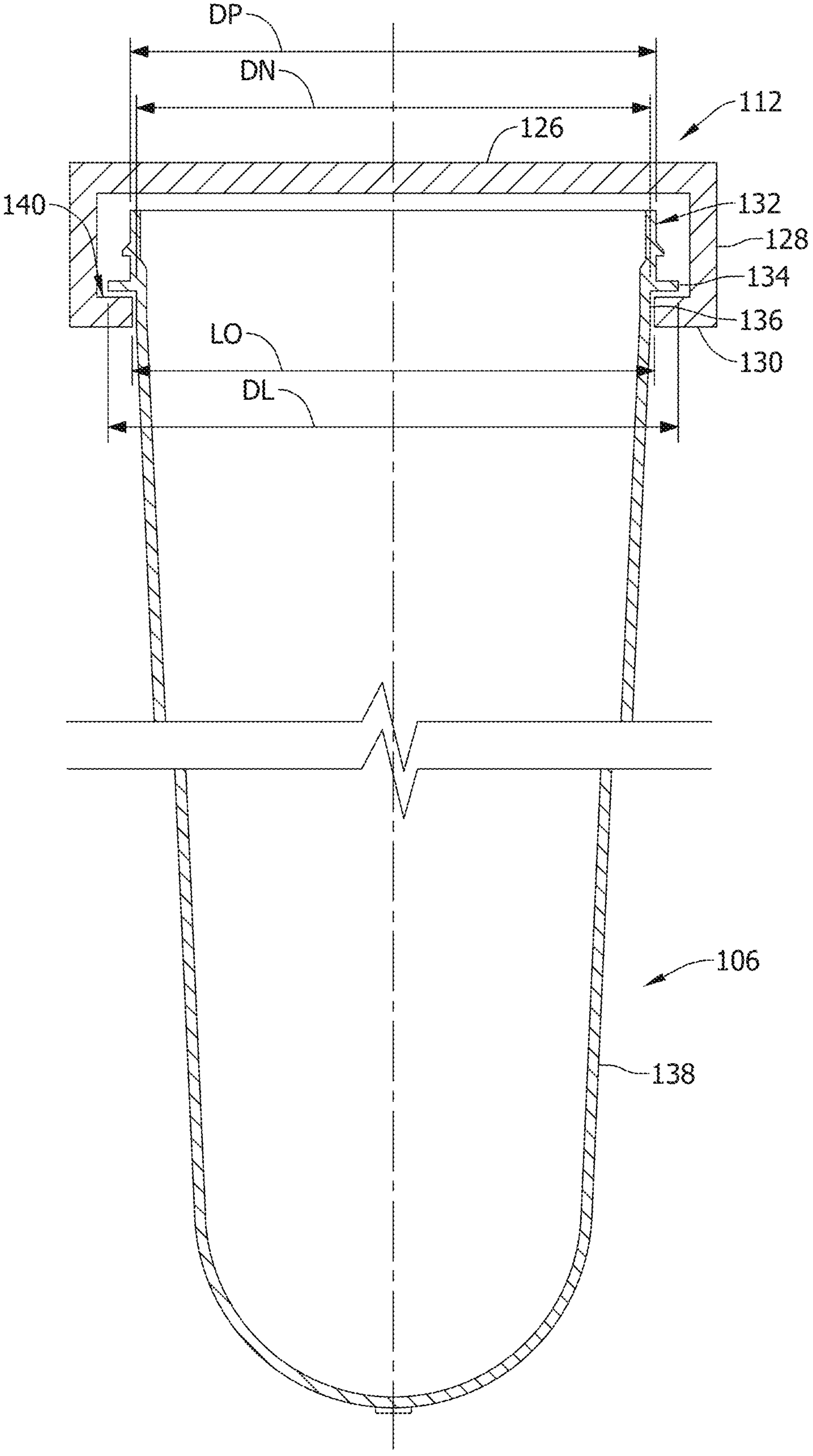
FIG. 2 illustrates a cross sectional view of a rail of the transfer system of FIG. 1 taken along line B-B in FIG. 1.

FIG. 2 illustrates a cross-sectional view of rail 112 and preform 106. Rail 112 includes an elongate body 126 having a U-shaped channel cross-section with protrusions 128 extending downward from body 126. Protrusions 128 further include opposed ledges 130 which extend inwardly from protrusions 128 and are adapted to interface with preform 106 as explained in further detail below. Opposed ledges 130 define an opening length (LO). Rail 112 is illustrated as a U-shaped channel. In other embodiments rail 112 may have another suitable channel shape. Also, rail 112 in some embodiments can be a rail assembly having a plurality of rails, where each rail corresponds to at least body 126 and opposed ledges 130. In the present disclosure, rail 112 includes a unitary body 126 and a pair of opposed ledges 130 as shown in FIG. 2.

As shown in FIG. 2, preform 106 includes an injection molded body having a threaded end 132, a circumferentially extending lip 134 adjacent threaded end 132, a neck 136 adjacent lip 134, and a cylindrical or conical wall 138 adjacent neck 136. At least a portion of wall 138 of preform 106 can extend through and/or below the opening formed within rail 112 and/or the opening defined between opposed ledges 130 of rail 112. Threaded end 132 defines a diameter (DP) of preform 106. Lip 134 defines a diameter (DL) of the preform 106. Neck 136 defines a diameter (DN) of preform 106. The magnitude of the ledge opening length (LO) defined between opposed ledges 130 of rail 112 is less than the magnitude of the lip diameter (DL) defined by circumferentially extending lip 134. Because the magnitude of dimension (DL) is greater than the magnitude of the opening (LO), when preform 106 is travelling along rail 112, lip 134 is seated on top surface 140 of opposed ledges 130. Lip 134 slides along top surface 140 as preform 106 moves in the downward direction DD along rail 112. Additionally, the magnitude of the opening dimension (LO) is greater than the magnitude of the diameter (DN) of neck 136 such that neck 136 is freely movable between opposed ledges 130.

Figure 3:
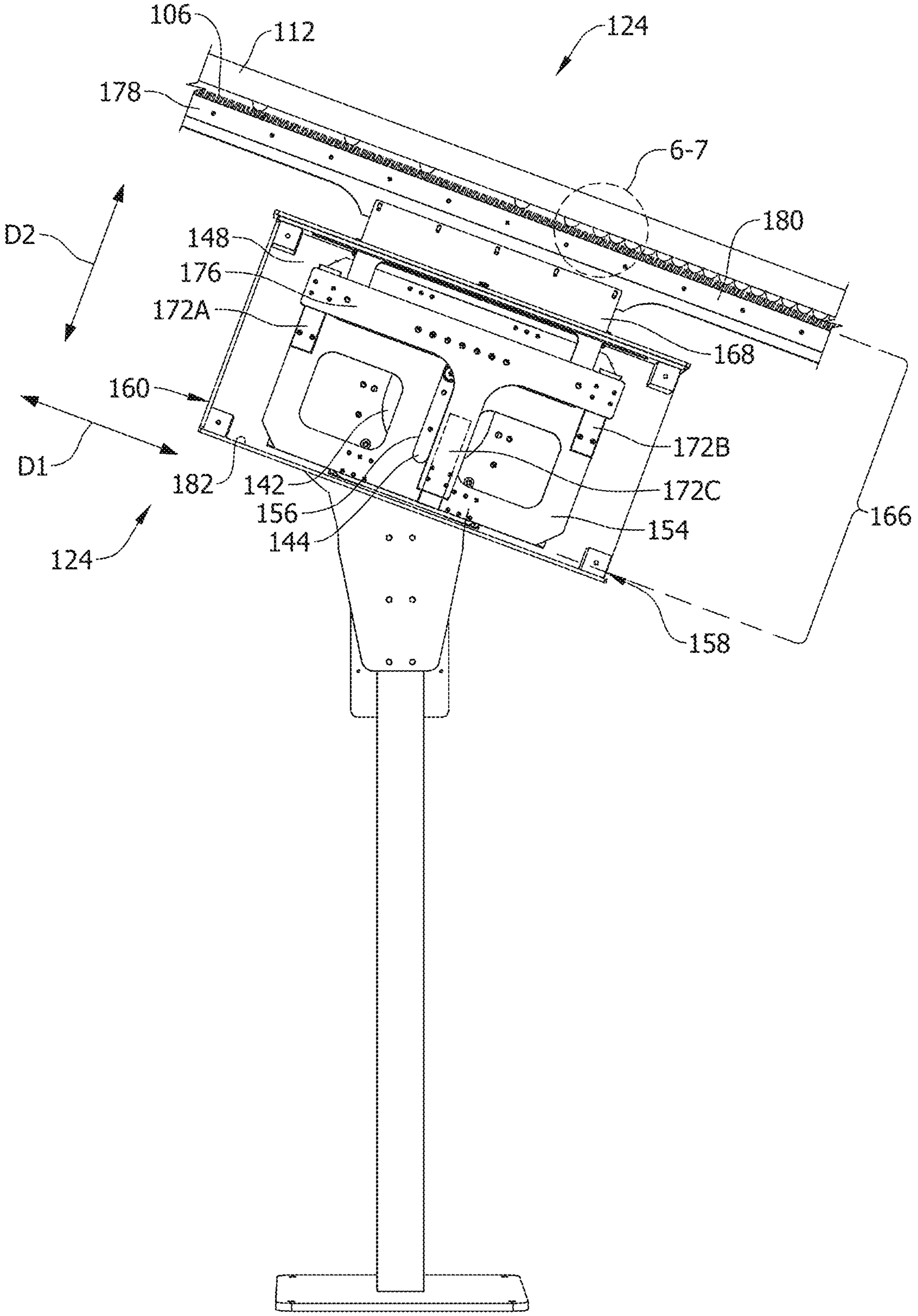
FIG. 3 illustrates a front view of a portion of the transfer system of FIG. 1 including the rail and the brush system.
Figure 4:
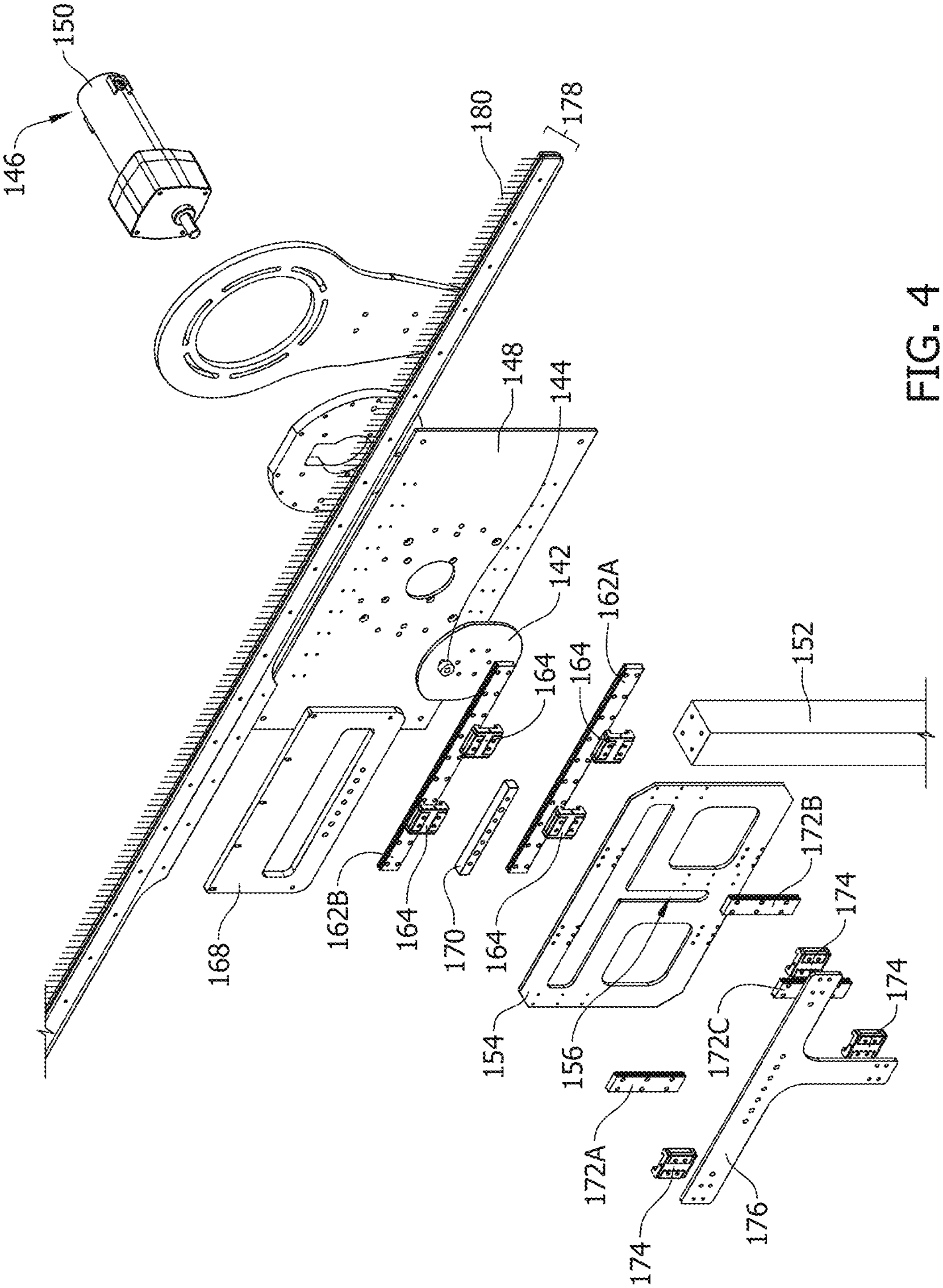
FIG. 4 illustrates an exploded, perspective view of the brush system of FIG. 3.
Figure 5:
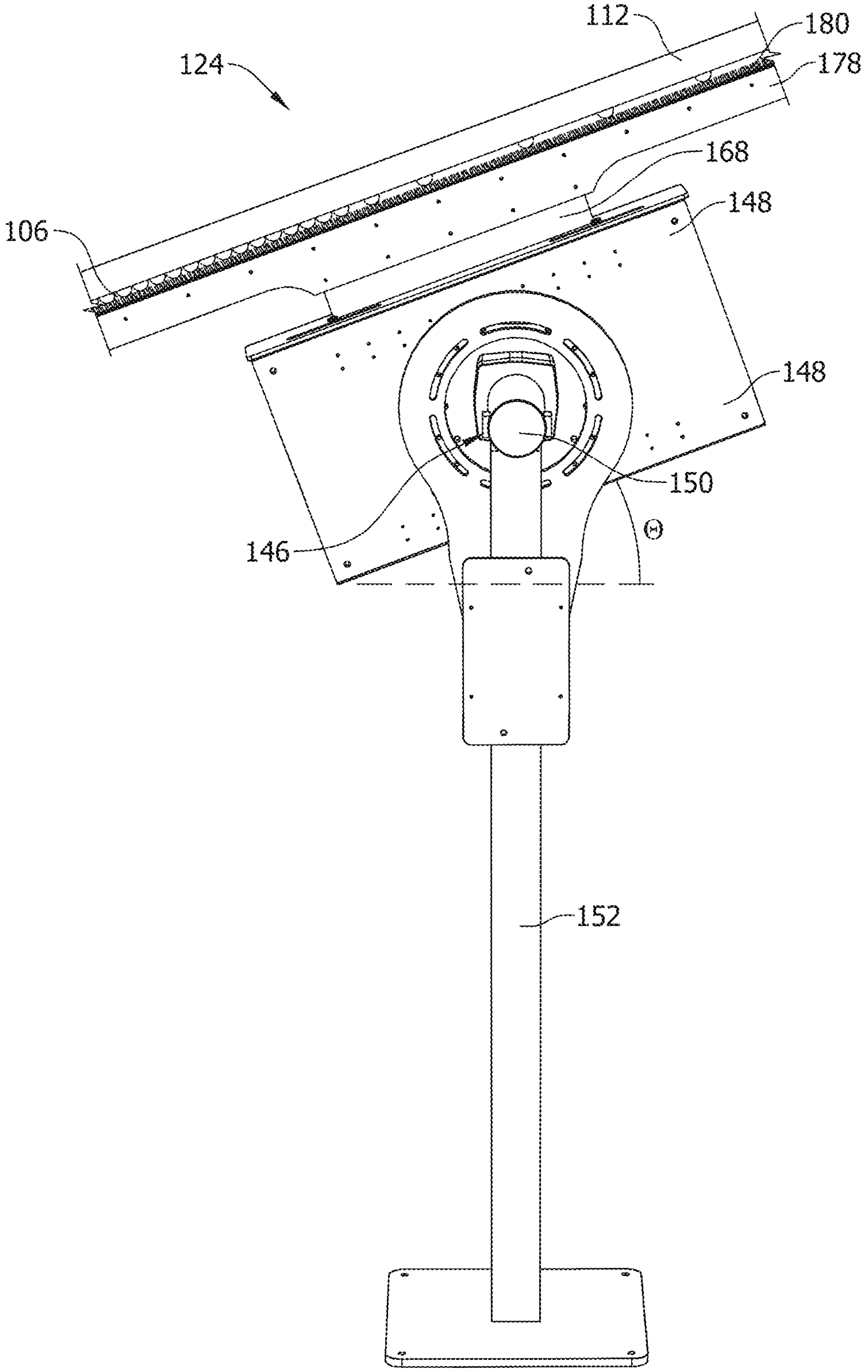
FIG. 5 illustrates a rear view of a portion of the transfer system of FIG. 1 including the rail and the brush system.

FIGS. 3-5 show a portion of transfer system 110 including a portion of rail 112 including preforms 106 slidably positioned therein, and brush system 124. More specifically, FIG. 3 shows a front view of rail 112 and brush system 124; FIG. 4 shows a partially exploded, perspective view of brush system 124 of transfer system 110; and FIG. 5 shows a rear view of rail 112 and brush system 124. It is understood that similarly numbered and/or named components may function in a substantially similar fashion. Redundant explanation of these components has been omitted for clarity.

Brush system 124 of transfer system 110 includes a rotatable cam 142. In a non-limiting example shown in FIG. 4, rotatable cam 142 is formed as an eccentric cam. More specifically, cam 142 of brush system 124 is formed as a substantially eccentric cam (e.g., pear-shaped), where a first curvature or section of an outer surface of cam 142 has a greater distance from the center of rotation for cam 142 than the remainder of the outer surface for cam 142. Although shown as a pear-shaped cam, it is understood that cam 142 can be formed form any suitable eccentric cam capable of moving brush system 124 in multiple directions (e.g., first direction (D1), second direction (D2)), as discussed herein. For example, cam 142 can be formed as a logarithmic-spiral (e.g., snail-shaped) cam or a circular cam having a center of rotation offset from the center of the circular cam. Additionally, cam 142 is formed from any suitable material that facilities the driving and/or movement of various components of brush system 124 during operation of molding system 100, as discussed herein. In non-limiting examples, cam 142 is formed from one or more of metal, alloys, ceramics, plastics, polymers, and the like.

Cam 142 includes a follow 144. As shown in FIGS. 3 and 4, follow 144 is affixed to and extends from a face of cam 142. More specifically, follow 142 extends outward from the face of cam 142. As discussed herein, follow 144 engages with, contacts, and/or moves distinct components of brush system 124 during the rotation of cam 142. Similar to cam 142, follow 144 is formed from any suitable material that facilities the driving and/or movement of various components of brush system 124 including, but not limited to, metal, alloys, ceramics, plastics, polymers, and the like.

Briefly turning to FIG. 5, brush system 124 of transfer system 110 also includes a motor 146. Motor 146 is operably coupled to cam 142. For example, motor 146 is coupled directly to cam 142 to facilitate the rotation of cam 142 within brush system 124 during operation of molding system 100. As discussed herein, the rotation of cam 142 causes the driving and/or movement of various components of brush system 124 in order to facilitate, aid, and/or improve the movement of preforms 106 within rail 112. Motor 146 is any suitable device, apparatus, or system that is capable of rotating cam 142. For example, motor 146 is an electric motor including a rotatable drive shaft or rotor that coupled directly to cam 142.

in the exemplary embodiment, a support structure 148 is positioned between cam 142 and motor 146. More specifically as shown in FIGS. 3-5, support structure 148 of brush system 124 is positioned adjacent to and substantially between cam 142 and motor 146. Support structure 148 provides bracing, mounting, and/or a foundation for various components of brush system 124. For example, and as shown in FIG. 5, a motor housing 150 of motor 146, in the exemplary embodiment, is coupled directly to support structure 148 to hold motor 146 in position within brush system 124. Additionally, as shown, support structure 148 is also coupled to a stand 152, which supports brush system 124 within molding system 100. In a non-limiting example, support structure 148 is rotatably coupled to stand 152, such that stand 152 facilitates adjusting the angular pitch or rotation (θ) of brush system 124 to match the angular pitch of rail 112. Stand 152 can also include a telescoping support leg that can adjust the height of brush system 124.

Brush system 124 also includes a bracket 154. In the non-limiting example shown in FIGS. 3 and 4, bracket 154 is positioned adjacent cam 142. Additionally, cam 142 is positioned and/or disposed between bracket 154 and support structure 148 within brush system 124. Bracket 154 includes at least one slot 156 formed therethrough. In the exemplary embodiment, slot 156 of bracket 154 receives follow 144 extending from cam 142. Slot 156 is sized or dimensioned to receive follow 144 and maintain follow 144 therein as cam 142 rotates during operation. Additionally, follow 144 contacts, impresses upon, and/or abuts a wall of slot 156 during rotation of cam 142. For example, and during operation of brush system 124, follow 144 rotating with cam 142 imparts a force on bracket 154, via slot 156, to move bracket 154 (and brush assembly 166 discussed herein) in a first direction (D1). More specifically, and based, at least in part, on the configuration of cam 142 (e.g., eccentric cam), the rotational direction of cam 142, the path of rotation of follow 144 during the rotation of cam 142, and/or the size/dimension of slot 156, the rotation of cam 142, and follow 144 extending through slot 156, moves bracket 154 in a first direction (D1) between a first/fourth position and a second/third position. In the example, cam 142/follow 144 move bracket 154 in the first direction (D1) to the first/fourth position, where bracket 154 is positioned directly adjacent a first side 158 of brush system 124 or a housing of brush system 124. Additionally in the example, cam 142/follow 144 move bracket 154 in the first direction (D1) to the second/third position, where bracket 154 is positioned directly adjacent a second side 160 of brush system 124/housing, opposite first side 158. As discussed herein, bracket 154 does not move in a second direction (D2) that is substantially perpendicular to the first direction (D1).

Bracket 154 is formed from any suitable material that is capable of the movement within brush system 124 during operation of molding system 100, as well as supporting additional components of brush system 124, as discussed herein. In non-limiting examples, bracket 154 is formed from metal, alloys, ceramics, plastics, polymers, and the like.

To facilitate and/or aid in movement in the first direction (D1), brush system 124 also includes at least one guide rail 162 and at least one slide bearing 164. In the non-limiting example shown in FIG. 4, brush system 124 includes two (2) guide rails 162A, 162B, and four (4) slide bearings 164. Guide rails 162A, 162B are coupled to support structure 148. In the exemplary embodiment, guide rail 162A is coupled to support structure 148 above cam 142, and guide rail 162B is coupled to support structure 148 below cam 142. As shown in FIG. 4, guide rails 162A, 162B are coupled to support structure 148 in an orientation substantially similar to or parallel with the first direction (D1).

Slide bearings 164 are affixed and/or coupled to bracket 154. More specifically, and as shown in FIG. 4, slide bearings 164 are affixed to bracket 154 and positioned between bracket 154 and guide rails 162A, 162B. In the non-limiting example, two (2) slide bearings 164 are positioned between bracket 154 and guide rail 162A, and two (2) slide bearings 164 are positioned between bracket 154 and guide rail 162B. The slide bearings 164 are slidably engaged with guide rails 162A, 162B to facilitate and/or guide the movement of bracket 154 in the first direction (D1) and/or facilitate distinct components of brush system 124 transitioning between various positions (e.g., first position through fourth position) during operation of molding system 100, as discussed herein. Slide bearing 164 is formed from any suitable component or apparatus that facilities the movement of bracket 154 including, but not limited to, a roller bearing assembly. Although brush system 124 discussed herein with respect to FIGS. 3-5 shows two (2) guide rails 162A, 162B, and four (4) slide bearings 164, it is understood that brush system 124 can include more or less guide rail(s) 162 and/or slide bearings 164.

Brush system 124 of transfer system 110 also includes a brush assembly 166 coupled to bracket 154 and is positioned adjacent and/or below rail 112 within molding system 100. Brush assembly 166 includes a yoke 168 and cam bar 170. Yoke 168 of brush assembly 166 is positioned adjacent to and is operably connected to cam 142. Additionally, cam bar 170 is coupled to yoke 168 and is positioned directly adjacent to and above cam 142. In a non-limiting example, and during operation, cam bar 170 remains in direct contact with cam 142 as cam 142 rotates. As discussed herein, and based, at least in part, on the eccentric configuration of cam 142, cam 142 contacting cam bar 170 can lift and/or move cam bar 170 in the second direction (D2). For example, as cam 142 rotates and cam bar 170 comes in contact with the first curvature or section of the outer surface of cam 142 having a greater distance from the center of rotation for cam 142 than the remainder of the outer surface for cam 142, cam bar 170 is lifted and/or moves upward in the second direction (D2). As a result of cam bar 170 moving upward in the second direction (D2), yoke 168 coupled to cam bar 170 (and all components of brush assembly 166 couple to yoke 168) also move upward in the second direction (D2). As cam 142 continues to rotate and cam bar 170 no longer contacts the first curvature or section, cam bar 170, and yoke 168 coupled thereto, is lowered and/or moves downward in the second direction (D2). As discussed herein, moving yoke 168/cam bar 170 in the second direction (D2) facilitates the engagement with and/or the contacting of preforms 106 and components of brush assembly 166.

In other non-limiting examples (not shown), cam bar 170 can be formed integral with yoke 168, or alternatively, yoke 168 can be formed and/or configured to contact cam 142 directly. In the latter non-limiting example, cam 142 contacting yoke 168 directly can move yoke 168 in the second direction (D2) during rotation/operation of molding system 100, as discussed herein. Similar to bracket 154, yoke 168 and cam bar 170 are formed from any suitable material that is capable of the movement within brush system 124 during operation of the molding system 100, as well as the continuous contact with cam 142 (e.g., cam bar 170) and/or supporting additional components of brush assembly 166 (e.g., yoke 168), as discussed herein. In non-limiting examples, yoke 168 and cam bar 170 are formed from one or more of metal, alloys, ceramics, plastics, polymers, and the like.

Similar to the movement of bracket 154 in the first direction (D1), in order to facilitate and/or aid in the movement in the second direction (D2), brush system 124 also includes at least one distinct guide rail 172 and at least one distinct slide bearing 174. In the non-limiting example shown in FIGS. 3 and 4, brush system 124 includes three (3) distinct guide rails 172A, 172B, 172C and three (3) distinct slide bearings 174. Guide rails 172A, 172B, 172C (shown in phantom in FIG. 3) are coupled directly to bracket 154. In the exemplary embodiment, distinct guide rail 172A is coupled to bracket 154 adjacent side 160, guide rail 172B is coupled to bracket 154 adjacent first side 158, and guide rail 172C is coupled to bracket 154 adjacent slot 156. As shown in FIGS. 3 and 4, guide rails 172A, 172B, 172C are coupled to bracket 154 in an orientation substantially similar to or parallel with the second direction (D2).

Slide bearings 174 are affixed and/or coupled to a slide plate 176 of brush assembly 166. That is, and as shown in FIGS. 3 and 4, slide plate 176 of brush assembly 166 is coupled to yoke 168, and slide bearings 174 are affixed to slide plate 176. Slide bearings 174 are also positioned between slide plate 176 and guide rails 172A, 172B, 172C, respectively. In the non-limiting example, one (1) slide bearing 174 is positioned between slide plate 176 and each guide rail 172A, 172B, 172C. The slide bearings 174 affixed to slide plate 176 are slidably engaged with guide rails 172A, 172B, 172C to facilitate and/or guide movement of slide plate 176, yoke 168, and other components of brush assembly 166 in the second direction (D2) and/or facilitate brush assembly 166 of brush system 124 transitioning between various positions (e.g., first position through fourth position) during operation of molding system 100, as discussed herein. Slide bearing 174 is formed from any suitable component or apparatus that facilities the movement of yoke 168/slide plate 176 including, but not limited to, a roller bearing assembly. The brush system 124 discussed herein with respect to FIGS. 3-5 includes three (3) distinct guide rails 172A, 172B, 172C and three (3) distinct slide bearings 174. However, it is understood that brush system 124 can include more or less distinct guide rail(s) 172 and/or distinct slide bearings 174.

Slide plate 176 is formed from any suitable material capable of movement using at least one distinct guide rail 172 and slide bearing 174 during operation of molding system 100, as discussed herein. In non-limiting examples, slide bearings 174 is formed from at least one of metal, alloys, ceramics, plastics, polymers, and the like.

In the non-limiting example, brush assembly 166 of brush system 124 also includes a brush holder 178. Brush holder 178 is coupled to yoke 168. More specifically, and as shown in FIG. 3, brush holder 178 is coupled directly to and is positioned above yoke 168 of brush assembly 166, and adjacent/below rail 112. Brush holder 178 is also positioned opposite cam 142, such that yoke 168 is positioned between cam 142 and brush holder 178. As a result of being coupled to yoke 168, and as discussed herein, brush holder 178 also moves in the second direction (D2) (e.g., lifted, lowered), as cam 142 is rotated during operation of molding system 100. Brush holder 178 is formed from any suitable material that facilities movement in the second direction (D2), as discussed herein, including, but not limited to, at least one of metal, alloys, ceramics, plastics, polymers, and the like.

Brush assembly 166 also includes a plurality of brushes 180. The plurality of brushes 180 are positioned within brush holder 178. More specifically, and as shown in FIGS. 3-5, the plurality of brushes 180 are positioned within, affixed to and/or extending from brush holder 178 toward rail 112 of transfer system 110. The plurality of brushes 180 are positioned between rail 112/preforms 106 and brush holder 178. As discussed herein, the plurality of brushes 180 contact preforms 106 during operation of molding system 100 to facilitate, aid, and/or improve the movement of preforms 106 within rail 112. The plurality of brushes 180 are formed from any suitable material that can contact preforms 106 and facilitate the movement of preforms 106 within rail 112 during operation. Additionally, the plurality of brushes 180 can be formed from a substantially flexible material that can deflect or bend when contacting preforms 106 to avoid lifting preforms 106 out of rail 112 and/or removing preforms 106 from ledge 130 (see, FIG. 2) of rail 112. For example, the plurality of brushes 180 can be formed from a nylon material. In other non-limiting examples, the plurality of brushes 180 can be formed from other polymers, metal, metal alloys, or organic material (wool, bamboo, etc.). The material used to form the plurality of brushes 180 can be dependent upon, at least in part, the size, shape, and/or configuration of preforms 106 moving along rail 112 during operation of molding system 100. Additionally, the plurality of brushes 180 can include a predetermined length that is similarly dependent upon, at least in part, the size, shape, and/or configuration of preforms 106. In a non-limiting example, the length of the plurality of brushes 180 can be between approximately one (1) inch (in.) and approximately four (4) inches.

Returning briefly to FIG. 1, brush holder 178 and the plurality of brushes 180 of brush assembly 166 include a predetermined length that spans at least a portion of the length of rail 112. In the non-limiting example shown, brush holder 178 and brushes 180 include a length that spans substantially over the entire length of rail 112, between inlet end 118 and outlet end 120. Brush holder 178 and brushes 180 include a length substantially equal to a length of rail 112 to contact and move an optimum or maximum amount of preforms 106 positioned within rail 112 during operation of molding system 100. In other non-limiting examples, brush holder 178 and brushes 180 can include a length smaller than the length of rail 112, such that the plurality of brushes 180 only contact preforms 106 positioned in a portion of rail 112.

As shown in the non-limiting example of FIG. 3, brush system 124 also includes a housing 182. Housing 182 substantially surrounds at least a portion of the components forming brush assembly 166. For example, housing 182 surrounds, covers, and/or houses cam 142, bracket 154, guide rail(s) 162, slide bearing(s) 164, a portion of yoke 168, cam bar 170, distinct guide rail(s) 172, slide bearing(s) 174, and slide plate 176. As shown in FIG. 3, yoke 168 extends through, outside of, and/or above housing 182 to position brush holder 178/the plurality of brushes 180 adjacent rail 112 during operation. Additionally, as shown in the non-limiting example, support structure 148 can form or define a portion of housing 182 for brush system 124. Components of brush system 124 that facilitate movement (e.g., cam 142, bracket 154, guide rail(s) 162, slide bearing(s) 164, cam bar 170, distinct guide rail(s) 172, slide bearing(s) 174, etc.) are disposed within housing 182 to protect the components from debris and/or to limit exposure of moving components during operation (e.g., operator safety measures).

Various components of brush system 124 are coupled or affixed to one another and/or distinct components of molding system 100. It is understood that each of these components of brush system 124 are coupled using any suitable coupling mechanism and/or technique. For example, distinct guide rail(s) 172 can be releasably coupled to bracket 154 using mechanical fasteners (e.g., screws, nuts-and-bolts, rivets, etc.), or alternatively can be permanently affixed to bracket 154 (e.g., welding, brazing, etc.).

Figure 6:
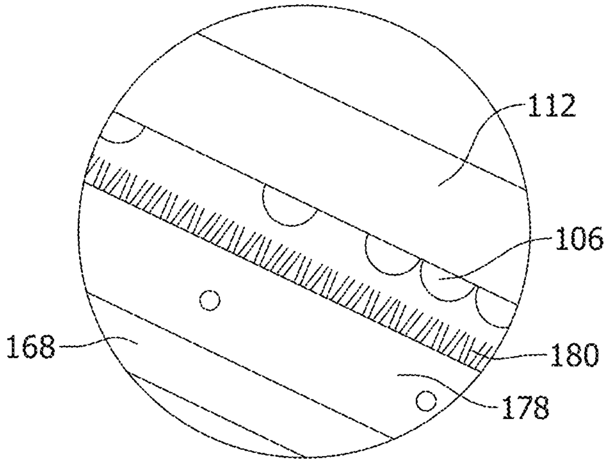
FIG. 6 illustrates an enlarged, front view of a portion identified as 6-7 in FIG. 3 including brushes of the brush system spaced apart from the preforms in the rail, in accordance with embodiments of the present disclosure.
Figure 7:
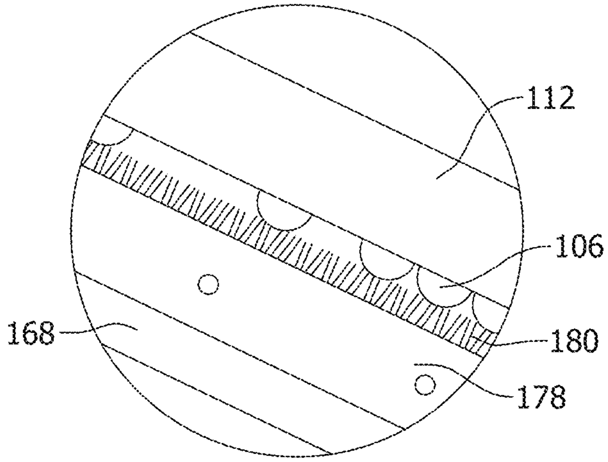
FIG. 7 illustrates an enlarged, front view of a portion identified as 6-7 in FIG. 3 including brushes of the brush system contacting the preforms in the rail, in accordance with embodiments of the present disclosure.

As discussed herein, brush system 124 moves in first direction (D1) and second direction (D2) during operation of molding system 100. More specifically, bracket 154 moves in a first direction (D1), and brush assembly 166 moves both the first direction (D1) and the second direction (D2) to facilitate, aid, and/or improve the movement of preforms 106 within rail 112. In a non-limiting example, brush system 124, and its various components, are configured to move in the first direction (D1) and/or second direction (D2), transitions between four distinct positions during operation. With continued reference to FIGS. 3-5, and as shown in FIGS. 6 and 7, depicting an enlarged portion identified as 6-7 in FIG. 3, the four distinct positions of brush system 124 are discussed below.

In a first position, bracket 154, and at least a portion of the components forming brush assembly 166 coupled to bracket 154, are positioned directly adjacent first side 158 of brush system 124/housing 182. Additionally in the first position, brush assembly 166, and more specifically the plurality of brushes 180, are in or have transitioned to a disengaged position. In the disengaged position, the plurality of brushes 180 are spaced apart from preforms 106 extending through and/or moving along rail 112. In the non-limiting example shown in FIG. 6, the plurality of brushes 180 are spaced apart from and do not contact preforms 106 extending through rail 112. In a non-limiting example where brush system 124 is beginning operation in the first position, the plurality of brushes 180 can be in the disengaged positioned prior to operation and subsequent positional transitioning (e.g., second position, third position, etc.). In another non-limiting example where the plurality of brushes 180 are transitioning from a fourth position, as discussed herein, back to the first position, the plurality of brushes 180 may move in the second direction (D2) and also transition from an engaged position to the disengaged position.

In a second position, bracket 154, and brush assembly 166 coupled to bracket 154, transition and/or are positioned directly adjacent second side 160 of brush system 124/housing 182. That is, and based on the rotation of cam 142, bracket 154 and brush assembly 166 are moved in the first direction (D1), toward second side 160 and opposite the downward direction (DD), to be situated in the second position during operation of transfer system 110. Similar to the first position, brush assembly 166, and more specifically the plurality of brushes 180, are in the disengaged position and/or are spaced apart from preforms 106 extending through and/or moving along rail 112 in the second position as well. In the non-limiting example, transitioning bracket 154 and brush assembly 166 from the first position to the second position only results in bracket 154 and brush assembly 166 moving in the first direction (D1). Components of the brush assembly 166 (e.g., the plurality of brushes 180) do not move in the second direction (D2) when transitioning between the first position and the second position, and therefore remain in the disengaged position and/or remain spaced apart from (e.g., do not contact) preforms 106. As brushes 180 move in a direction opposite the downward direction (DD)/first direction (D1) (e.g., transition between first and second position), the maintained space between the plurality of brushes 180 and preforms 106 ensures the brushes 180 do not undesirably contact preforms 106.

In a third position, bracket 154 and brush assembly 166 remain positioned directly adjacent second side 160 of brush system 124/housing 182. That is and based on the rotation of cam 142 and the movement of follow 144 within slot 156 of bracket 154, bracket 154 and brush assembly 166 do not move in the first direction (D1) and/or in downward direction (DD) when transitioning between the second position and the third position. Distinct from the first position and second position, brush assembly 166, and more specifically the plurality of brushes 180, move in a second direction (D2) in the third position. The plurality of brushes 180 move or transition in the second direction (D2) to contact preforms 106 extending through and/or moving along rail 112. More specifically, and as shown in FIG. 7, the plurality of brushes 180 are lifted, moved, and/or transition in the second direction (D2) toward rail 112 and contact preforms 106 extending through rail 112 in the third position. The movement in the second direction (D2) to contact preforms 106 extending through rail 112 also transitions the plurality of brushes 180 from the disengaged position to an engaged position. In a non-limiting example, the plurality of brushes 180 flex or bend upon contacting preforms 106. In another non-limiting example, and dependent upon, at least in part, the material forming the plurality of brushes 180, the plurality of brushes 180 contact and lift preforms 106 within rail 112.

In a fourth position, bracket 154, and brush assembly 166 coupled to bracket 154, are positioned directly adjacent first side 158 of brush system 124/housing 182. That is, and based on the rotation of cam 142, bracket 154 and brush assembly 166 are moved in the first direction (D1), and in the same direction as the downward direction (DD), toward first side 158 to transition to the fourth position during operation of transfer system 110. Similar to the third position, and as brush system 124 transitions from the third position to the fourth position, brush assembly 166, and more specifically the plurality of brushes 180, remain in the engaged position and contact preforms 106 extending through and/or moving along rail 112. More specifically, the plurality of brushes 180 remain lifted, remain in contact with preforms 106 extending through rail 112, and/or remain in the engaged position when transitioning from the third position to the fourth position. Maintaining contact between the plurality of brushes 180 and preforms 106 as brush assembly 166 and/or bracket 154 move in a first direction (D1) toward first side 158 facilitates, aids, and/or improves the movement of preforms 106 within rail 112. Additionally, the plurality of brushes 180 contacting preforms 106 and transitioning between the third and fourth position can readjust and/or positionally correct misaligned and/or tilted preforms 106 within rail 112. For example, contact between the plurality of brushes 180 and preforms 106 can displace, adjust, and/or reposition the preforms 106 in a desired orientation within guide rail 112 and/or prevent or reduce the number of jams that occur within rail 112, while still moving preforms in the downward direction (DD), as discussed herein.

The process of transitioning between the first through fourth position of brush system 124 continuously occurs during operation. As discussed herein, transitioning from fourth position to first position results in backet 154 and brush assembly 166 remaining adjacent first side 158 of brush system 124/housing 182. Additionally, the transition from fourth position to first position results in the plurality of brushes 180 moving in a second direction (D2) and/or transitioning from the engaged position to the disengaged position, such that a spacing is one again formed between preforms 106 extending through rail 112 and the plurality of brushes 180.

Figure 8:
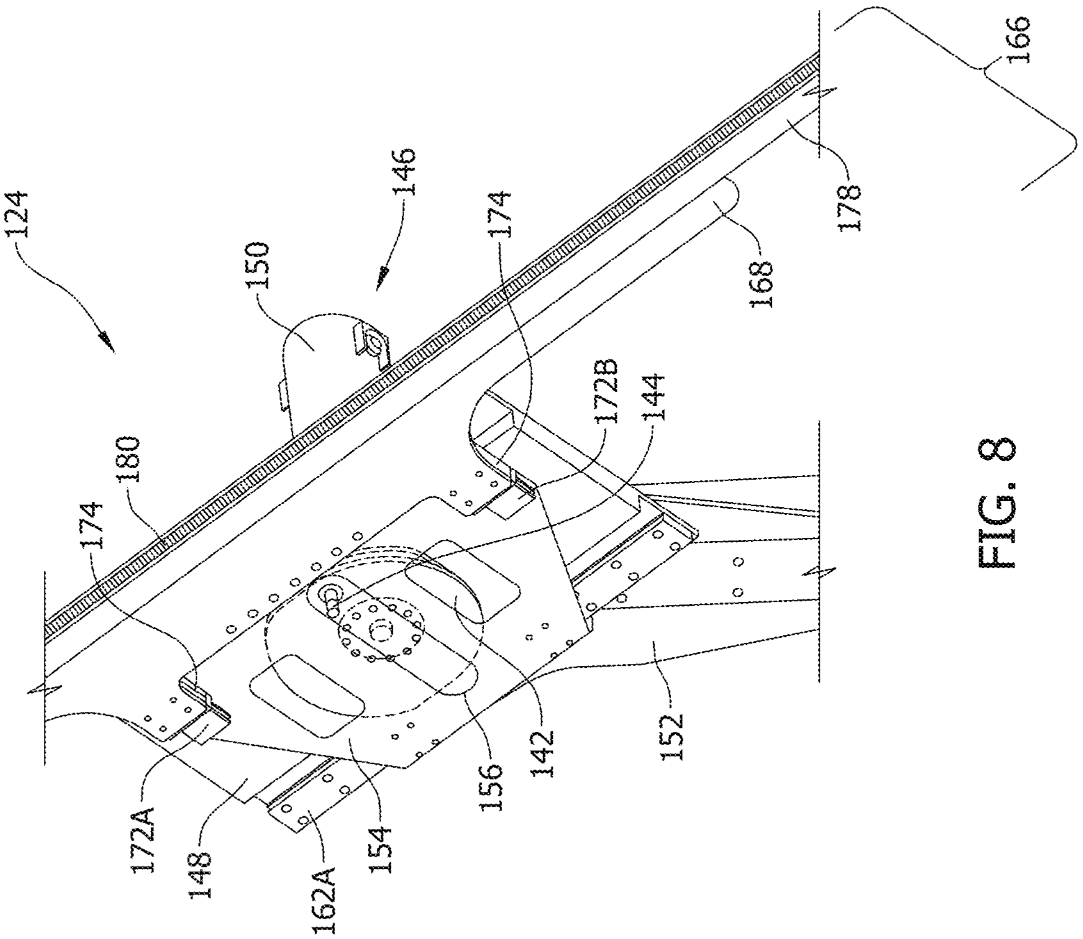
FIG. 8 illustrates a perspective view of a brush system for the transfer system, in accordance with an alternate embodiment of the present disclosure.

FIG. 8 shows a front perspective view of a portion of brush system 124 for transfer system 110. It is understood that similarly numbered and/or named components may function in a substantially similar fashion. Redundant explanation of these components has been omitted for clarity.

Distinct from brush system 124 shown and discussed herein with respect to FIGS. 3-5, the non-limiting example of brush system 124 shown in FIG. 8 can include or exclude distinct components and/or include distinct component connections and/or couplings. For example, brush system 124 shown in FIG. 8 does not include slide plate 176. Rather, yoke 168 coupled to cam bar 170 (not shown), is also slidably coupled to bracket 154. More specifically, slide bearings 174 are affixed and/or coupled to a yoke 168 of brush assembly 166. As shown in FIG. 8, slide bearings 174 affixed to yoke 168 directly are also positioned between yoke 168 and guide rails 172A, 172B, respectively. In the non-limiting example, slide bearings 174 coupled to yoke 168 slidably engage guide rail 172A, 172B coupled and/or affixed to bracket 154 to facilitate and/or guide the movement of yoke 168, brush holder 178 coupled to yoke 168, and the plurality of brushes 180 in the second direction (D2) during operation of molding system 100. As such, when brush assembly 166 moves in the second direction (D2) to contact (e.g., third position) or separate (e.g., first position) from preforms 106, slide bearings 174 coupled to yoke 168 slidably engage rail(s) 172A, 172B on bracket 154.

The methods, systems, and compositions disclosed herein are not limited to the specific embodiments described herein, but rather, steps of the methods, elements of the systems, and/or elements of the compositions may be utilized independently and separately from other steps and/or elements described herein. For example, the methods, systems, and compositions are not limited to practice with only a rotary machine as described herein. Rather, the methods, systems, and compositions may be implemented and utilized in connection with many other applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A brush system comprising:

a cam including a follow extending from said cam;

a bracket positioned adjacent said cam and including a slot for receiving said follow;

a brush assembly coupled to said bracket including:

a yoke positioned adjacent to and operably connected to said cam;

a brush holder coupled to said yoke, opposite said cam; and a plurality of brushes positioned within said brush holder;

a motor coupled to and configured to rotate said cam, wherein rotation of said cam causes said bracket and said brush assembly to move in a first direction, and said brush holder and said plurality of brushes to move in a second direction substantially perpendicular to said first direction;

a support structure positioned between said cam and said motor;

at least one guide rail coupled to said support structure; and a slide bearing affixed to said bracket and positioned between said bracket and said at least one guide rail, said slide bearing configured to slidably engage said at least one guide rail.

2. The brush system of claim 1, further comprising:

at least one distinct guide rail coupled to said bracket; and a distinct slide bearing configured to slidably engage with said at least one distinct guide rail.

3. The brush system of claim 2, wherein said brush assembly further includes a slide plate coupled to said yoke, and wherein said distinct slide bearing is coupled to said slide plate and positioned between said slide plate and said at least one distinct guide rail.

4. The brush system of claim 2, wherein said distinct slide bearing is coupled to the yoke of the brush assembly and positioned between said yoke and said at least one distinct guide rail.

5. The brush system of claim 1, wherein said brush assembly further includes a cam bar coupled to said yoke, said cam bar positioned directly adjacent to and contacting said cam during rotation.

6. The brush system of claim 1, wherein said rotation of said cam causes said bracket and said brush assembly to move between:

a first position wherein said bracket is adjacent a first side of a housing substantially surrounding said cam, and said plurality of brushes are in or transition in said second direction to a disengaged position;

a second position wherein said bracket and said brush assembly transition in said first direction, said bracket is adjacent a second side of said housing, opposite said first side, and said plurality of brushes remain in said disengaged position;

a third position wherein said bracket remains adjacent said second side of said housing, and said plurality of brushes transition in said second direction to an engaged position; and a fourth position wherein said bracket and said brush assembly transition in said first direction, said bracket is adjacent said first side of said housing, and said plurality of brushes remain in said engaged position.

7. A transfer system for transferring a plurality of items, said transfer system comprising:

a rail for receiving the plurality of items, said rail including an opening, wherein at least a portion of each of the plurality of items received by said rail extends through said opening; and a brush system positioned adjacent said rail and including:

a cam including a follow extending from said cam;

a bracket positioned adjacent said cam and including a slot for receiving said follow of said cam;

a brush assembly coupled to said bracket and including:

a yoke positioned adjacent to and operably connected to said cam;

a brush holder coupled to said yoke, opposite said cam and adjacent said rail; and a plurality of brushes positioned within said brush holder and extending from said brush holder towards said rail; and a motor coupled to and configured to rotate said cam, wherein rotation of said cam causes said bracket and said brush assembly to move in a first direction, and said brush holder and said plurality of brushes to move in a second direction substantially perpendicular to said first direction, wherein when said brush moves in the first direction said brush is configured to contact the plurality of items and move them in the first direction.

8. The transfer system of claim 7, wherein the brush system further includes:

a support structure positioned between said cam and said motor;

at least one guide rail coupled to said support structure;

a slide bearing affixed to said bracket and positioned between said bracket and said at least one guide rail, said slide bearing configured to slidably engage the at least guide rail;

at least one distinct guide rail coupled to said bracket; and a distinct slide bearing configured to slidably engage with said at least one distinct guide rail.

9. The transfer system of claim 8, wherein said brush assembly further includes: a slide plate coupled to said yoke, wherein said distinct slide bearing is coupled to said slide plate and positioned between said slide plate and said at least one distinct guide rail.

10. The transfer system of claim 8, wherein said distinct slide bearing is coupled to said yoke and positioned between said yoke and said at least one distinct guide rail.

11. The transfer system of claim 7, wherein said brush assembly further includes: a cam bar coupled to said yoke, said cam bar positioned directly adjacent to and contacting said cam during rotation.

12. The transfer system of claim 7, wherein the rotation of the cam of the brush system causes the bracket and the brush assembly to move between:

a first position wherein said bracket is adjacent a first side of a housing of said brush system, and said plurality of brushes are in or transition in said second direction to a disengaged position and spaced apart from said plurality of items extending through said opening of said rail;

a second position wherein said bracket and said brush assembly transition in said first direction, said bracket is adjacent a second side of said housing, opposite said first side, and said plurality of brushes remain in said disengaged position;

a third position said bracket remains adjacent said second side of said housing, and said plurality of brushes transition in said second direction to an engaged position to contact said plurality of items extending through said opening of said rail; and a fourth position wherein said bracket and said brush assembly transition in said first direction, said bracket is adjacent said first side of said housing, and said plurality of brushes remain in said engaged position to contact said plurality of items extending through said opening of said rail.

13. The transfer system of claim 7, wherein said plurality of items includes a plurality of preforms, wherein when said brush contacts the plurality of preforms, said brush is configured to reposition at least one of the preforms in a desired orientation.

14. A molding system comprising:

a first machine including a plurality of items;

a second machine positioned proximate said first machine; and a transfer system positioned between and operably connecting said first machine and said second machine to transfer said plurality of items from said first machine and said second machine, said transfer system including:

a rail for receiving said plurality of items, said rail including an opening, wherein at least a portion of each of said plurality of items received by said rail extends through said opening; and a brush system positioned adjacent said rail and including:

a cam including a follow extending from said cam;

a bracket positioned adjacent said cam and including a slot for receiving said follow of said cam;

a brush assembly coupled to said bracket and including:

a yoke positioned adjacent to and operably connected to said cam;

a brush holder coupled to said yoke, opposite said cam and adjacent said rail; and a plurality of brushes positioned within said brush holder and extending from said brush holder towards said rail; and a motor coupled to and configured to rotate said cam, wherein rotation of said cam causes: said bracket and said brush assembly to move in a first direction; and said brush holder and said plurality of brushes to move in a second direction substantially perpendicular to said first direction.

15. The molding system of claim 14, wherein said brush system further includes:

a support structure positioned between said cam and said motor;

at least one guide rail coupled to said support structure;

a slide bearing affixed to said bracket and positioned between said bracket and said at least one guide rail, said slide bearing configured to slidably engage said at least guide rail;

at least one distinct guide rail coupled to said bracket; and a distinct slide bearing configured to slidably engage with said at least one distinct guide rail.

16. The molding system of claim 15, wherein said brush assembly further includes: a slide plate coupled to said yoke, wherein said distinct slide bearing is coupled to said slide plate and positioned between said slide plate and said at least one distinct guide rail.

17. The molding system of claim 15, wherein said distinct slide bearing is coupled to said yoke and positioned between said yoke and said at least one distinct guide rail.

18. The molding system of claim 15, wherein said brush assembly further includes: a cam bar coupled to said yoke, said cam bar positioned directly adjacent to and contacting said cam during rotation.

19. The molding system of claim 14, wherein the rotation of the cam of the brush system causes the bracket and the brush assembly to move between:

a first position wherein said bracket is adjacent a first side of a housing of said brush system, and said plurality of brushes are in or transition in said second direction to a disengaged position and spaced apart from said plurality of items extending through said opening of said rail;

a second position wherein said bracket and said brush assembly transition in said first direction, said bracket is adjacent a second side of said housing, opposite said first side, and said plurality of brushes remain in said disengaged position;

a third position said bracket remains adjacent said second side of said housing, and said plurality of brushes transition in said second direction to an engaged position to contact said plurality of items extending through said opening of said rail; and a fourth position wherein said bracket and said brush assembly transition in said first direction, said bracket is adjacent said first side of said housing, and said plurality of brushes remain in said engaged position to contact said plurality of items extending through said opening of said rail.

20. The molding system of claim 14, wherein said plurality of items includes a plurality of preforms.

* * * * *